No. 771,002.

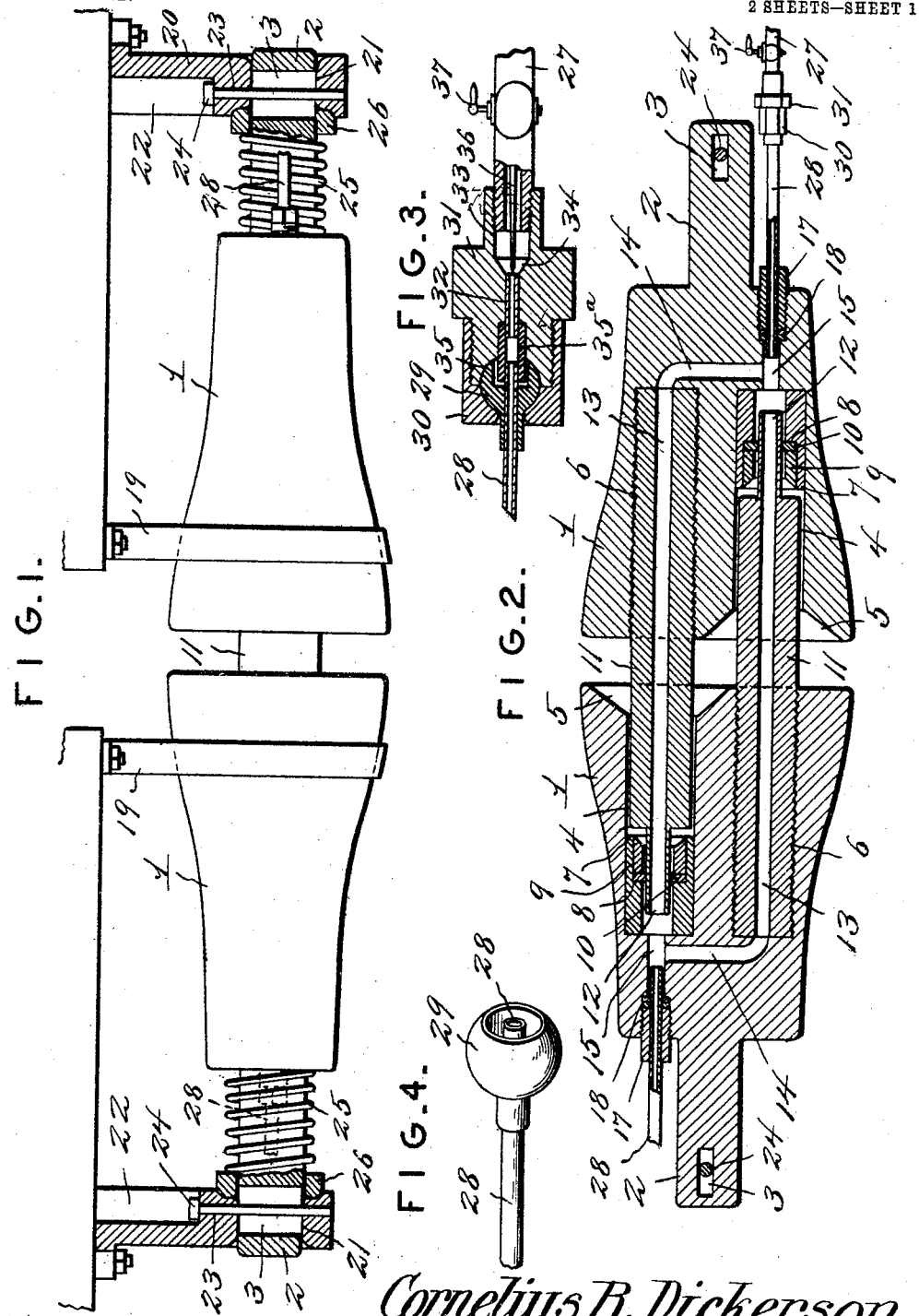

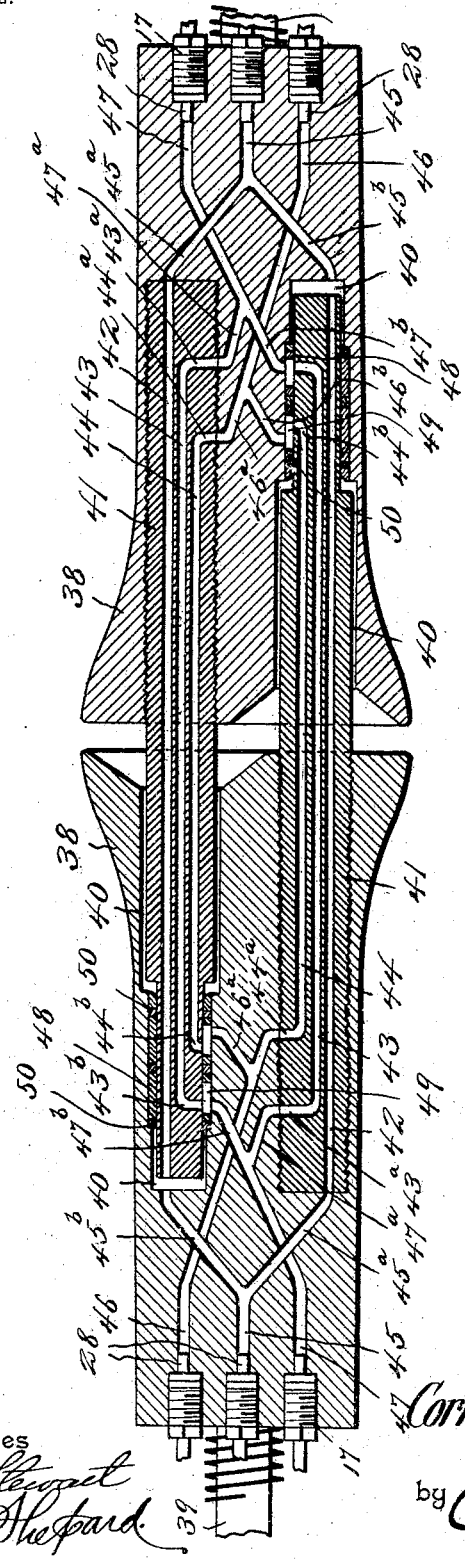

Patented September 27, 1904.

UNITED STATES PATENT OFFICE.

CORNELIUS B. DICKERSON, OF CLIO, VIRGINIA.

AUTOMATIC TRAIN-PIPE COUPLING.

SPECIFICATION forming part of Letters Patent No. 771,002, dated September 27, 1904.

Application filed May 5, 1904. Serial No. 206,558. (No model.)

*To all whom it may concern:*

Be it known that I, CORNELIUS B. DICKERSON, a citizen of the United States, residing at Clio, in the county of Floyd and State of Virginia, have invented a new and useful Automatic Train-Pipe Coupling, of which the following is a specification.

This invention relates to train-pipe systems, and has for its object to provide an improved coupling for the train-pipes of adjacent cars and to have said coupling capable of automatic connection with the complementary coupling of another car when run together for coupling and also to effect an automatic uncoupling of the train-pipes by the uncoupling of the cars. It is furthermore designed to mount the coupling so as to automatically accommodate for buffing and draft strains and the up and down movements of the car-bodies upon the trucks thereof.

Another object is to provide for connecting the present form of coupling with the arrangement of train-pipes as now in common use without altering or changing the same in any manner whatsoever.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a sectional elevation of a pair of couplings embodying the features of the present invention and arranged in coupled relation. Fig. 2 is a horizontal sectional view thereof. Fig. 3 is an enlarged detail sectional view through the universal joint of the coupling. Fig. 4 is a detail perspective view of the ball member of the universal joint. Fig. 5 is a view similar to Fig. 2, showing the device arranged for coupling the air-pipes for the brakes, the steam-pipes for the heating system, and the air-pipes for the signaling apparatus and taken on the line 5 5 of Fig. 6. Fig. 6 is a cross-sectional view of Fig. 5. Fig. 7 is a detail view of a pair of washers employed in the construction shown in Fig. 5.

Like characters of reference designate corresponding parts in each and every figure of the drawings.

The coupling of the present invention embodies a head 1, which terminates at its rear end in a reduced stem 2, having a vertically-disposed longitudinal slot 3, while its forward end is provided with a smooth cylindrical seat or socket 4, disposed at one side of the longitudinal axis of the head and having a flaring entrance or mouth 5, there being another cylindrical internally-screw-threaded socket 6 at the opposite side of the longitudinal center of the head. The rear portion of the seat 4 is reduced by a pair of annular shoulders 7 and 8, and between these shoulders is a tubular seat member 9, formed of Babbitt or other suitable metal, with a packing 10 interposed between the seat member and the shoulder 8. The outer end of the seat member 9 is flared for a purpose that will be hereinafter described. A cylindrical nozzle member 11 is secured into the screw-threaded socket 6 and is provided at its outer end with a reduced terminal 12. The rear end of the longitudinal bore 13 of the nozzle communicates with a passage 14, formed transversely through the head of the coupling in rear of the socket 6, and intersects a longitudinal passage 15, which communicates at its forward end with the back of the seat 4, with its rear end piercing the rear end of the coupling. The rear end of the passage 15 is enlarged and screw-threaded for the reception of a stuffing-box comprising a screw-threaded gland 17 and one or more packing-rings 18. The body of the coupling thus constructed is loosely hung beneath the usual car-coupling by means of a hanger 19, which is secured to any convenient portion of the under side of the car-frame, while the rear end of the stem 2 is supported in a bracket 20, which is also hung from the under side of the car-body. This bracket has an opening 21 for the reception of the stem, and the front and rear ends of the opening are beveled or flared, so as to permit of a lateral swinging of the coupling when rounding curves. One face of the bracket is provided with a vertical slot or groove 22, which intersects the top of the bracket and terminates short of the opening 21, with a perforation 23 intersecting the bottom of the slot and communicating with the opening 21 to permit of the insertion of a pin 24 through the bracket and the longitudinal slot 3 of the stem, thereby to permit of a limited endwise movement of the coupling under the action of buffing and draft strains. A suitable helical spring 25 embraces the stem 2 and bears in opposite directions against the rear end of the head of the coupling and the bracket 20, there being a suitable washer 26 interposed between the spring and the bracket to take the wear of the rear end of the spring.

To provide for connecting the present form of coupling-head with the usual train-pipe, which has been indicated at 27, a metallic pipe or tube 28 is employed, the forward end of which is extended into the stuffing-box 17, so as to communicate with the rear end of the seat 4, and is capable of sliding in an endwise direction through the stuffing-box, or, to be more correct, the coupling-head is capable of sliding upon the tube. At the rear end of the tube there is a substantially spherical cup 29, which is fixed upon the tube and has its open rear end terminated substantially flush with the rear end of the tube, and swiveled upon or rotatably embracing the cup is an internally-screw-threaded coupling-sleeve 30. A tubular coupling member 31 has its forward externally-screw-threaded portion engaged with the screw-threaded interior of the sleeve 30. The middle portion of this coupling is pierced by a comparatively small longitudinal passage 32, which is enlarged at its rear end, as at 33, so as to form a valve-seat 34, the rear extremity of the enlarged portion 33 being screw-threaded. The front end of the coupling member 31 is provided with a semispherical seat or socket 35 to loosely embrace the cup 29, thereby to coöperate with the sleeve 30 to form a universal joint upon the rear end of the tube 28. A short flexible tube 35ª projects from the forward end of the passage 32 into the socket 35 and is of a size to embrace the rear end of the tube 28, so as to accommodate for the rocking movement of the pipe within the socket and insure a continuous communication between the pipe and the air-passage in the coupling. The train-pipe 27 screws into the rear end of the coupling member 31, with its inlet-valve 36 working in the longitudinal air-passage of the member 31 in coöperative relation with the valve-seat 34, the usual operating handle or lever of the valve being illustrated at 37.

When two reversely-disposed couplings of the present type are brought together, the nozzles 11 automatically enter the corresponding sockets 4, with the reduced terminals 12 of the nozzles snugly fitting the seats 9, and thereby in communication with the longitudinal air-passages 15 of the opposite couplings. When the valve 36 is open, the air will pass forwardly through the tube 28 into the longitudinal air-passage 15 of the adjacent coupling-head, from which it passes through the transverse passage 14 into the nozzle 11 and thence into the longitudinal air-passage 15 of the opposite coupling, and some of the air also passes into the socket 4 and thence into the nozzle of the other coupling and through the transverse passage 14 of said other coupling into its longitudinal passage 15 and thence through the tube 28 into the train-pipe. When the cars are uncoupled and drawn apart, the present train-pipe couplings will automatically separate without injury to any of the parts thereof. It will now be understood that the seat 9 in the socket 4 is formed of Babbitt metal or other suitable yieldable material, so as to form an air-tight joint between the reduced terminal 12 of the nozzle, which fits thereinto.

Under the action of buffing and draft strains the coupling-heads are capable of moving back and forth against the tension of the springs 25 and are also capable of swinging laterally upon the rear ends of the stems as centers when the train is rounding a curve, and as the heads are loosely supported in the hangers they are capable of rising and falling without damage to their connections with the car. When moving back and forth under buffing and draft strains, the pipe 27 slides through the stuffing-box 17 without an interruption of the air-supply, and the universal joint formed at the rear end of the pipe 28 permits of the necessary lateral and vertical play of the coupling-head.

The construction hereinbefore described, and illustrated in Figs. 1 to 4, inclusive, is for coupling a single service-pipe—as, for instance, the air-pipe for the air-brake system of a freight-train; but when the device is employed upon a passenger-train it is necessary to provide for coupling two other service-pipes—viz., the service-pipe for the steam-heating system and the air-pipe for the signaling apparatus—and such an arrangement has been provided for, as illustrated in Figs. 5 to 7, inclusive, which will now be described. In this multiplex arrangement the coupling-head 38 is of substantially the same configuration as hereinbefore described, it being provided at its rear end with a stem 39 and in its forward end with a nozzle-receiving smooth socket 40 and the nozzle 41, secured into the head diametrically opposite the socket 40. Instead of a single longitudinal passage each nozzle 41 is provided with three longitudinal passages, (designated 42, 43, and 44, respectively.) The passage 42 extends throughout the entire length of the nozzle and intersects opposite ends thereof, the passage 43 being terminated short of the ends of the nozzle and provided with a lateral inlet branch 43$^a$, intersecting the inner side of the nozzle, and a transverse outlet branch 43$^b$, intersecting the same side of the reduced terminal of the nozzle. The other passage, 44, is shorter than the passage 43 and is provided with a terminal lateral inlet branch 44$^a$ and an opposite terminal lateral outlet branch 44$^b$. At one side of the stem of the head and piercing the rear end thereof is a longitudinal inlet-passage 45, which is connected to one of the service-pipes through the medium of the slidable and pivotal joint or coupling, as shown in Fig. 3 of the drawings, while its forward end is divided into forwardly-diverging branches 45$^a$ and 45$^b$, of which the branch 45$^a$ communicates with the rear end of the passage 42 in the nozzle, which is carried by the adjacent coupling-head, while the passage 45$^b$ communicates with the back of the socket 40 in the same coupling-head, and thereby in communication with the outer end of the passage 42 in the nozzle of the opposite coupling-head. Communication is had between the passage 45 of the other coupling-head and the two nozzles in precisely the same manner as just described. Therefore a continuous communication is maintained between the two passages 45 when the coupling members are in coupled relation. At one side of the passage 45 is another passage 46, which passes forwardly and is inclined transversely across the coupling-head beneath the passage 45$^b$ and is divided into branches 46$^a$ and 46$^b$, which pierce the inner walls of the respective screw-threaded and smooth sockets and communicate with the respective inlet branches 44$^a$ and 44$^b$ of the passages 44 of the nozzles, the other ends of the passages 44 being in communication with the passage 46 of the other coupling-head in precisely the same manner as just described. At the opposite side of the passage 45 there is another passage, 47, which inclines transversely beneath the branch passage 45$^a$ and above the passage 46, with its forward end divided into branches 47$^a$ and 47$^b$, which communicate, respectively, with the branch passages 43$^a$ and 43$^b$ of the passages 43. To prevent leakage at the joints between the reduced terminal of each nozzle and the nozzle-receiving socket, the rear portion of said socket is provided with a pair of reducer-sleeves 48, preferably formed of Babbitt metal, each of which is provided with a transverse opening or port 49, so as to afford communication between the passages 44$^b$ and 46$^b$ and between the passages 43$^b$ and 47$^b$, a suitable spacing-washer 50 being interposed between the two sleeves, thereby to insure a tight fit of the reduced portion of the nozzle within the rear portion of the socket.

From the foregoing description it is apparent that the multiplex form of coupling provides efficient means for coupling the service-pipes of the three train-pipe systems, and the service-pipes may be readily connected to the passages 45, 46, and 47, according to their arrangement upon the car. In other words, any one of the passages 45, 46, and 47 may be connected to the steam-heating system, the service-pipe of the signaling apparatus, or to the air-brake pipe, as each passage affords an unbroken communication from one car to another and is equally adapted for conducting steam as well as air. When two couplings are brought together, the passages of the nozzles automatically register with the passages of the sockets and do not require any special adjustment after the couplings have been united. At this point it will be noted that the openings 49 in the reducer-sleeves 48 are considerably longer than the diameters of the passages formed through the nozzle in order to maintain an uninterrupted communication between the passages of the nozzle and the passages of the coupling-head during longitudinal movements in opposite directions of opposite couplings under draft and buffing strains.

Referring to Fig. 3 of the drawings, it is preferred to have the passage 32 formed by a short pipe-section, with the flexible tube 35$^a$ snugly embracing the forward end of this pipe, so as to be held in place against the action of the ball-and-socket joint.

Having thus described the construction and operation of my invention, what I claim as new, and desire to secure by Letters Patent, is—

1. A train-pipe coupling comprising a coupling-head terminating at its rear end in a reduced connecting-stem and provided with a longitudinal nozzle-receiving socket at one side of its longitudinal axis and opening through the front end of the head and a nozzle carried by and projected at the front of the head at the opposite side of the longitudinal axis thereof, the rear portion of the head having a passage intersecting the back thereof for connection with a train-pipe and provided with branches leading to the nozzle and the socket respectively.

2. A train-pipe coupling comprising a coupling-head having its rear end provided with a reduced connecting-stem and also provided with a nozzle-receiving socket intersecting the front end of the head at one side of the longitudinal axis thereof, a nozzle carried by and projected at the front of the head at the opposite side of the longitudinal axis thereof, the rear of the head having a passage intersecting the back thereof at one side of the stem and provided with branches leading to the nozzle and the socket respectively and a pipe fitted to the passage and provided at its rear end with a universally-jointed coupling for connection with a train-pipe.

3. A train-pipe coupling comprising a coupling-head and an air-pipe connected thereto and provided at one end with a universal joint comprising a substantially semispherical cup carried by and embracing the pipe, a sleeve loosely embracing the cup, and a tubular coupling member having a socket to loosely receive the cup and detachably connected to the sleeve.

4. A train-pipe coupling comprising a coupling-head, an air-pipe connected thereto and provided at its rear end with a hollow substantially spherical cup embracing the pipe, a screw-threaded sleeve loosely embracing the cup, and a tubular coupling member terminally screw-threaded for connection respectively with the sleeve and the train-pipe, the bore of the tubular coupling member having a valve-seat therein, the forward end of said member having a socket to loosely receive the cup, and the forward end of the bore of the coupling member having a flexible nipple engaging the rear end of the pipe.

5. In a train-pipe coupling, the combination of front and rear hangers, the rear hanger having a horizontal opening and provided in one face with a vertical groove intersecting the top of the hanger and terminated short of the opening therein with a perforation piercing the bottom of the groove and intersecting the opening, a coupling-head loosely supported in the front hanger and having a stem loosely received in the opening of the bracket and provided with a longitudinal slot, and a pin passed through the perforation of the bracket and engaging the slotted stem to permit of a limited slidable movement of the head.

6. A train-pipe coupling comprising a coupling-head having a nozzle and a nozzle-receiving socket independent of the nozzle, the nozzle being provided with a plurality of longitudinal passages, one of said passages intersecting the opposite ends of the nozzle and the other passages intersecting a side of the nozzle near opposite ends thereof, the rear portion of the head being provided with passages intersecting the rear extremity thereof and corresponding in number to the number of passages in the nozzle, each passage of the head being branched with one branch registered with the adjacent end of one of the passages in the nozzle and its other branch communicating with the nozzle-receiving socket for registration with the corresponding passage of a complementary nozzle.

7. A train-pipe coupling comprising a coupling-head having a nozzle and a nozzle-receiving socket, the nozzle being provided with a plurality of longitudinal passages, one of which passages intersects opposite ends of the nozzle, the other passages intersecting a side of the nozzle near opposite ends thereof, the rear portion of the coupling-head being provided with passages intersecting the rear extremity thereof and corresponding in number to the passages of the nozzle, each passage being branched for communication with the nozzle and the nozzle-receiving socket, one branch of one of the passages being in communication with the rear end of the nozzle-receiving socket and the corresponding branches of the other passages intersecting a side of the nozzle-receiving socket, and reducer-rings fitted within the socket and provided with openings registered with the branch passages which intersect a side of the socket, the openings of the reducer-rings being longer than the diameters of the branch passages to provide elongated outlets therefor.

In testimony that I claim the foregoing as my own I have hereto affixed my signature in the presence of two witnesses.

CORNELIUS B. DICKERSON.

Witnesses:
D. R. WOOD,
V. M. SOWDER.